No. 685,691. Patented Oct. 29, 1901.
R. McKNIGHT.
ART OF EXTRACTING GOLD FROM REFRACTORY ORES.
(Application filed Jan. 12, 1900.)
(No Model.)
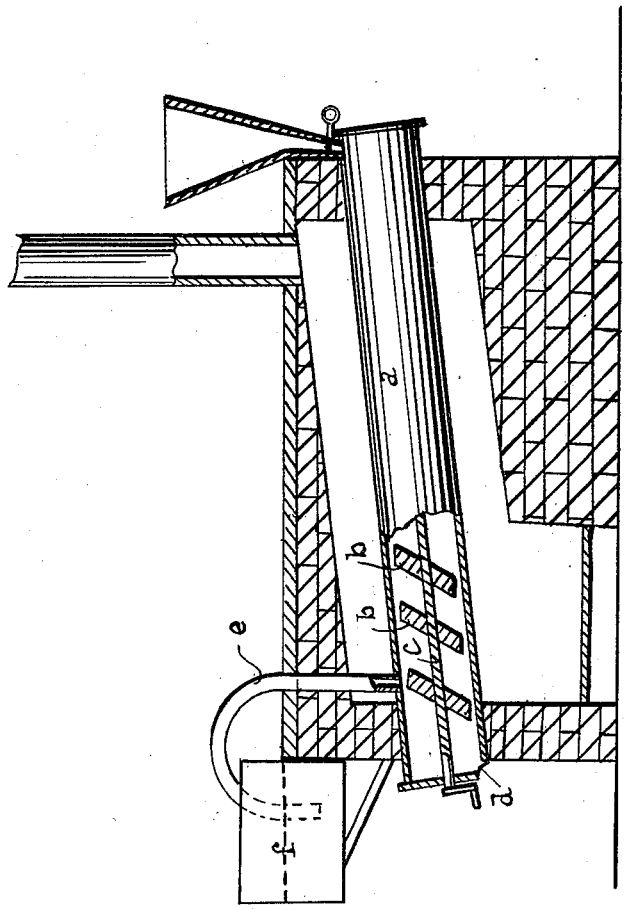
Witnesses
A. M. Long
Alex Scott
Inventor
Robert McKnight
per his atty
Markwith Corlet

United States Patent Office.

ROBERT McKNIGHT, OF NEW YORK, N. Y., ASSIGNOR TO METALLIC CONDENSE COMPANY, A CORPORATION OF DELAWARE.

ART OF EXTRACTING GOLD FROM REFRACTORY ORES.

SPECIFICATION forming part of Letters Patent No. 685,691, dated October 29, 1901.

Application filed January 12, 1900. Serial No. 1,206. (No specimens.)

*To all whom it may concern:*

Be it known that I, ROBERT McKNIGHT, a citizen of the United States, and a resident of the city, county, and State of New York, have invented a new and useful Improvement in the Art of Extracting Gold from Refractory Ores, of which the following is a clear and sufficient specification, reference being had to the drawing annexed.

My invention consists in causing by roasting in a substantially closed receptacle a reaction between a haloid salt of an alkaline metal the precious metal of the ore and the acid radical of a refractory metalloid, which acid radical has a greater affinity for the alkaline metal than has the halogen when the two are heated in the presence of free oxygen, the whole operation being performed with a free admission of air into the substantially closed receptacle and with an agitation of the ore contained in said receptacle, carrying off, volatilizing, and collecting the haloid salt of the precious metal.

The drawing illustrates an apparatus capable of being used in carrying out my process.

Describing now the best method of which I am aware of practicing my invented art, the pulverized ore (usually about thirty mesh) of the precious metal containing refractory metalloids is mixed with a haloid salt of an alkaline metal and placed in a cylinder that can be substantially closed, so as to shut off from the ore and any volatile material arising therefrom the fire and gases of combustion of the furnace, but permitting free access of air into its interior. The relative proportions of the materials may be stated as follows: Enough of the haloid salt must be introduced to supply enough of the halogen to combine with the precious metal and to form it into a haloid salt; enough of the refractory metalloids must be present to combine with the alkaline metal and set free the halogen, and enough oxygen must be present to form with the alkaline metal and the refractory metalloid an oxygen salt containing the two materials. The refractory metalloids are generally sulfur, tellurium, selenium, and arsenic. After the pulverized ore mixed with the haloid salt is introduced into the chamber the latter is heated until a reaction takes place between the refractory metalloid and the oxygen of the air, whereby an anhydrid of the former is produced which reacts with the haloid salt, setting free the halogen and forming an oxysalt of the alkaline metal and the refractory metalloid. This oxysalt is stable and remains in the gangue. The nascent halogen then combines with the precious metal and is volatilized and drawn off the ore while it is being treated, and the volatilized products thereof, which being drawn off and collected, are kept carefully apart from the flame and gases of combustion of the furnace.

Taking up now as an illustration only the treatment of a particular ore in the apparatus shown, take as the particular ore one containing iron pyrites and gold in a plate of fine division and take as the haloid salt sodium chlorid. The ore is ground fine and mixed with the salt, placed in the cylinder $a$, and roasted. The paddles $b\,b$ are rotated by means of the spindle $c$ in order to allow all parts of the ore to come in contact with the air, which can enter at the ore-outlet. In all practical cases, of course, the reaction is necessarily complex on account of the many materials present in the ore; but this can be conceived as the essential reaction in this instance:

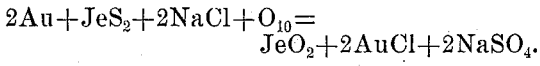

$$2Au + JeS_2 + 2NaCl + O_{10} = JeO_2 + 2AuCl + 2NaSO_4.$$

The auric chlorid will volatilize and, rising, will be carried off through the pipe $e$, which is connected with the condenser $f$, in which the chlorid of gold is condensed. This condensation will of course act to draw over the fumes of gold chlorid from the chamber and draw in more air. The ferric oxid and the sodium sulfate will pass out with the gangue.

Having now described my invention, what I claim, and desire to secure by Letters Patent, is—

1. The art of treating refractory ores containing precious metals and a refractory metalloid, which consists in pulverizing the ore, mixing with the pulverized ore a quantity of haloid salt of an alkaline metal, the relative proportions of the materials being substantially those quantitatively requisite to produce when heated in the presence of oxygen, a haloid salt of the precious metal, and an oxygen salt of the alkaline metal and the refractory metalloid, roasting the mixture with free access of air and agitation at a temperature sufficient to effect the reaction mentioned, but substantially shut off from the products of combustion, until the reactions above mentioned are accomplished, and volatilizing and recovering the precious-metal values as haloids or oxyhaloids; substantially as described.

2. The art of treating refractory ores containing precious metals and a refractory metalloid, which consists in pulverizing the ore, mixing with the pulverized ore chlorid of sodium, the relative proportions of the materials being substantially those quantitatively requisite to produce when heated in the presence of oxygen, a chlorid of the precious metal and an oxygen salt of the sodium and the refractory metalloid, roasting the mixture with free access of air, but shut off from the products of combustion, and until a chlorid of the precious metal and an oxy-salt of the refractory metalloid and the sodium is produced, and continuing the heating until the said chlorid is volatilized and carrying off and collecting the same separate and apart from the fumes of combustion of the furnace; substantially as described.

In token whereof I have hereunto set my hand this 5th day of January, 1900.

ROBERT McKNIGHT.

Witnesses:
M. W. COLLET,
E. E. BERTHOUD.